Figure 1:
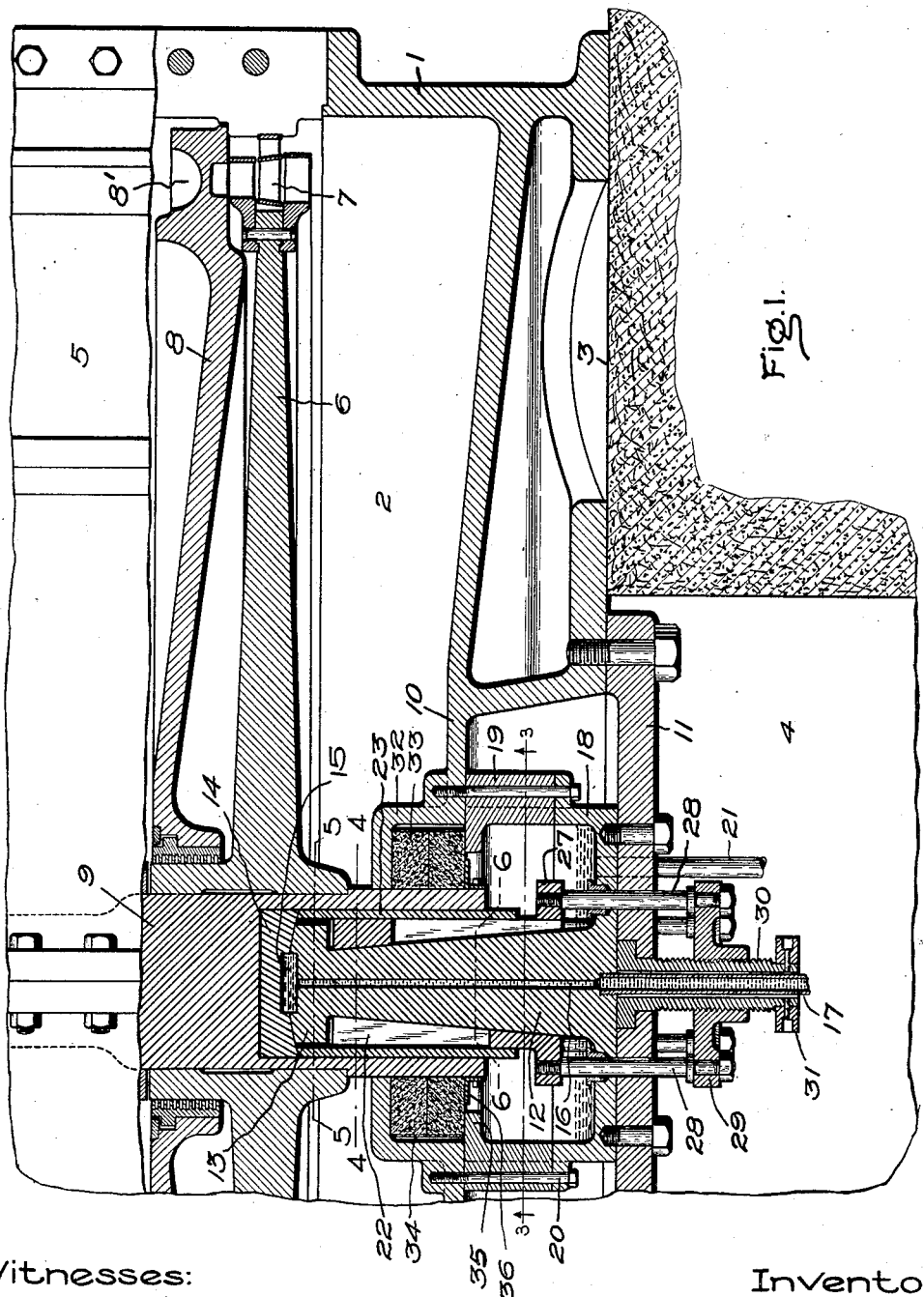

A. C. PRATT.
BEARING FOR TURBINES.
APPLICATION FILED JUNE 14, 1907.

1,017,588.

Patented Feb. 13, 1912.

2 SHEETS—SHEET 1.

Witnesses:
Marcus L. Byng.
J. Ellis Glen

Inventor,
Alphonso C. Pratt,
By Allen H. Davis
Att'y.

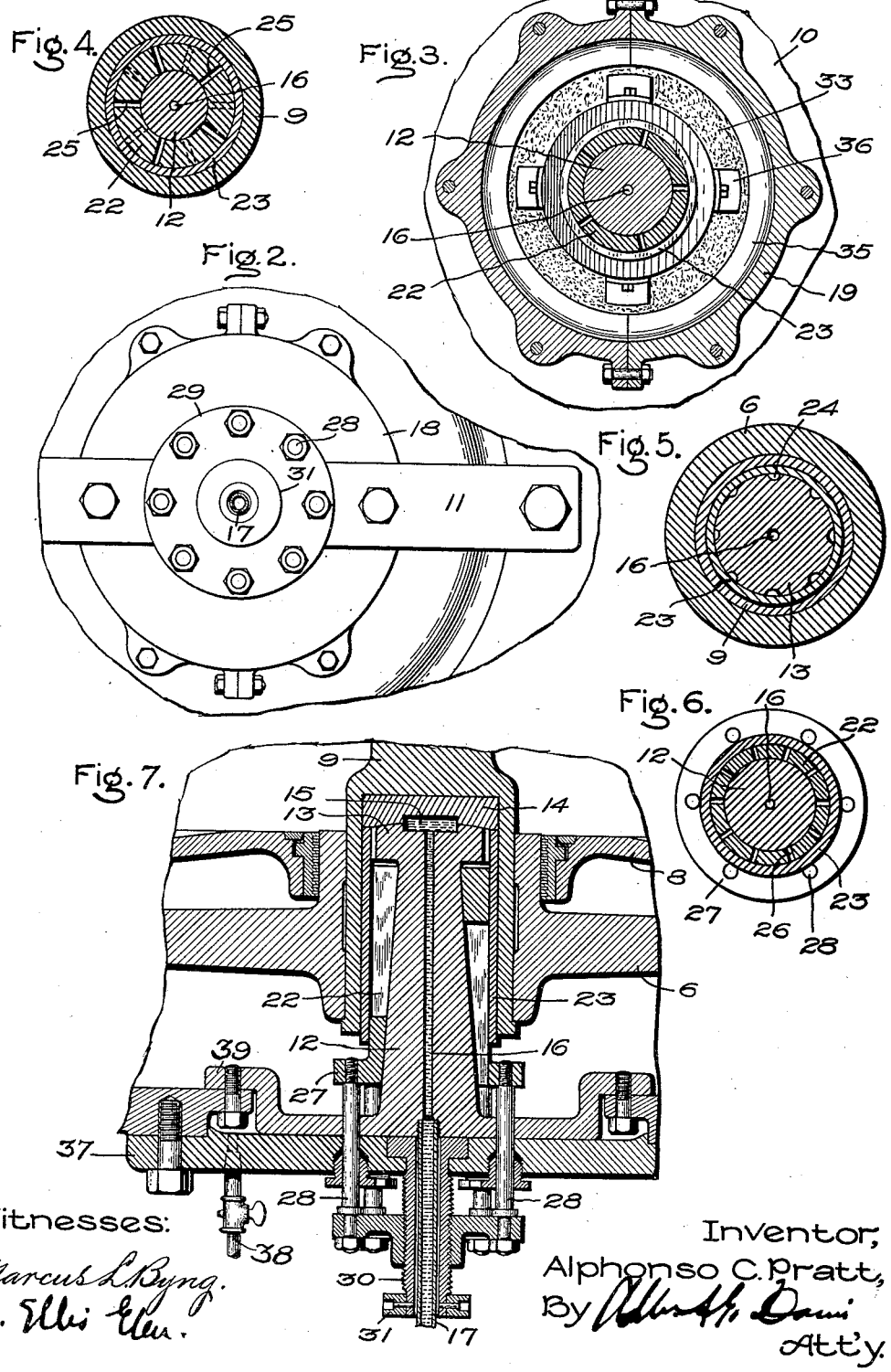

UNITED STATES PATENT OFFICE.

ALPHONSO C. PRATT, OF NEWARK, NEW JERSEY, ASSIGNOR TO GENERAL ELECTRIC COMPANY, A CORPORATION OF NEW YORK.

BEARING FOR TURBINES.

1,017,588.   Specification of Letters Patent.   Patented Feb. 13, 1912.

Application filed June 14, 1907. Serial No. 378,938.

*To all whom it may concern:*

Be it known that I, ALPHONSO C. PRATT, a citizen of the United States, residing at Newark, county of Essex, State of New Jersey, have invented certain new and useful Improvements in Bearings for Turbines, of which the following is a specification.

In constructing elastic-fluid turbines, it is important to make the shaft as short as possible to avoid the whipping action thereof due to bending, and also prevent the shaft when vertical from having too great a clearance in the guide-bearings, since these result in vibrations which ultimately injure the machine.

The purpose of my invention is to provide a turbine of improved construction which is free from the objections above noted.

In the accompanying drawings which illustrate one of the embodiments of my invention, Figure 1 is a longitudinal section of a vertical-shaft turbine; Fig. 2 is an inverted plan view showing portions of the under side of the base of the turbine; Fig. 3 is a cross-section taken on line 3—3 of Fig. 1, looking in the direction of the arrows; Fig. 4 is a section taken on line 4—4 of Fig. 1; Fig. 5 is a section taken on line 5—5 of Fig. 1; Fig. 6 is a section taken on line 6—6 of Fig. 1; and Fig. 7 is a longitudinal section of a part of a turbine adapted for water lubrication for the step- and guide-bearings.

1 indicates the base of the turbine, which is provided with a chamber 2, the latter being connected by a suitable conduit with a condenser or atmospheric exhaust. The base is mounted upon a suitable foundation 3 containing a pit 4 permitting access to the under side of the bearings. Mounted on top of the base is a casing 5 containing the wheels 6 having rows of peripheral buckets with intermediate buckets 7 between. The casing is divided into two or more chambers by the diaphragm 8 containing stage nozzles 8′.

9 indicates the upright shaft of the turbine, upon which the wheels are mounted. The lower end of the shaft is made hollow to receive the step- and guide-bearings, although the whole shaft may be hollow if desired. The lower wall 10 of the chamber 2 is bored centrally to receive the lower end of the shaft. Extending across the opening is a beam 11 which carries a vertical support 12, the latter extending into the bore of the shaft. On the upper end of the support is the lower step-bearing block 13. This block may be made integral with the support or separate as desired. The upper block 14 for the step-bearing is also mounted within the bore of the shaft and the opposed faces of the blocks are struck from a center midway of the length of the guide-bearing. It is to be noted that the step-bearing, instead of being a considerable distance below the last wheel is substantially in the plane thereof.

Between the two blocks is formed a chamber 15 to which lubricant is fed by the conduit 16. This conduit may be formed by boring a longitudinal hole in the support and permitting the lubricant to flow through it, or a pipe may be inserted through the bore in the support and tapped into the lower block. In the present case a pipe 17 is provided which is threaded into the lower end of the support to which lubricant under high pressure is supplied. This pressure should be great enough to maintain a thin film of lubricant between the upper and lower bearing-blocks at all times when the turbine is in operation. After the lubricant escapes from the step-bearing it is employed to lubricate the guide-bearing, as will hereinafter appear. The support 12 is formed integrally with an annular member 18 which is bolted to the beam 11 and is supported thereby. Situated above the annular member 18 is a ring 19 which engages the under side of the wall 10, and bolts 20 secure the parts in place. The parts 18 and 19 form a chambered annular member to receive the lubricant after it escapes from the bearings. Connected to the annular member is a pipe 21 for carrying off the exhaust lubricant and returning it to the suction side of the lubricating pump. The support 12 below the step-bearing blocks is made conical, gradually decreasing in diameter toward the top.

Surrounding the tapered portion of the support is a sleeve 22 which is provided with longitudinal slots to permit of its diameter being increased or decreased to change the clearance between it and the lining 23 located in and movable with the main shaft. One set of slots is open at the upper end while the other set is open at the lower end. It is to be observed that the slots opening at the top do not extend quite to the bottom of the lining, while the slots which are open at the bottom terminate some little distance from the top of the sleeve. By reason of this construction, after the lubricant escapes from between the step-bearing blocks it flows by the vertical passages 24, Fig. 5, into the space or chamber just below the lower step-bearing block. From this point it flows into the slots 25, Fig. 4, and as the shaft rotates, lubricant is fed to the passages or slots 26, from which it escapes into the chamber of the annular member and is exhausted by the conduit 21. The lower end of the bearing sleeve 22 is provided with a split annular flange 27 to which are secured a number of vertical rods 28 that pass through the base of the annular member 18, suitable packings being provided to prevent the escape of lubricant. The rods are connected to a cross-head 29, the latter being mounted upon a screw 30. The screw is mounted in the frame-bar 11 and is free to turn therein but is prevented from moving longitudinally. On the end of the screw is a head 31 having holes to receive a spanner-wrench. By rotating the screw in one direction or the other the cross-head will be caused to move up or down as the case may be, and with it the sleeve. Owing to the yielding nature of the sleeve as it is moved up its diameter will decrease slightly, and when it is moved down it will increase thus changing the clearance between it and the lining 23.

I regard the feature of an expansible guide-bearing as being a very important one in that it enables me to operate the machine with a minimum shaft clearance, which means, other things being equal, that the tendency for the shaft to vibrate is reduced to a minimum. It is also to be observed that the step-bearing is located above the guide-bearing and in that portion of the bore surrounded by the hub of the bucket wheel. By reason of this construction I am able to materially reduce the total length of the shaft, and by reducing the length of the shaft, the tendency of the latter to whip or to vibrate is decreased.

In order to prevent air from the chamber in the annular member from entering the chamber 2 in the base of the machine when the latter is operating condensing or to prevent the passage of steam from the chamber 2 into that of the annular member under non-condensing service conditions, a packing is provided that is located in a housing 32. In the present instance the packing comprises two carbon packing rings 33 that make a snug fit with the lower end of the shaft and are pressed into engagement therewith by outside springs 34. The top of the upper packing ring engages with the housing and the bottom of the lower one with the inturned flanges 35 on the member 19 and the brackets 36 secured to the shaft.

In Fig. 7 is shown a slight modification of the invention adapted for water lubrication. In this case the packing is dispensed with, and the water escaping from the step and guide bearing is permitted to mingle with the exhaust steam and pass to the condenser or other exhaust. The opening in the under side of the base is covered by a plate 37 having attached thereto a valved pipe 38 by means of which water can be drained out of the wheel chamber when desired. The support that carries the step bearing block 13 is mounted on a flange or part 39 which in turn is bolted to the base of the machine.

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a turbine, a shaft with a hollow end, in combination with a step-bearing located within the bore of said end, a support therefor, a guide-bearing also located within said bore, means external to the bore of the shaft for changing the diameter of the guide bearing to adjust the clearance, and a conduit passing through the support for supplying lubricant to said bearings.

2. In a turbine, a shaft with a hollow end, in combination with a step-bearing located within the bore of said end, a support therefor, a guide-bearing also located within said bore, a means for changing the diameter of the guide-bearing to vary the shaft clearance, and a conduit passing through the guide-bearing and discharging lubricant to the step-bearing.

3. A shaft having a hollow end, in combination with a support that enters the bore of said end, a bearing block carried by the shaft, a stationary block carried by the support, a guide bearing mounted on the support between the stationary block and the end of the shaft, and a means for increasing or decreasing the diameter of the guide bearing to change the clearance between it and the shaft.

4. A vertical shaft having a hollow lower end, in combination with a base, a support mounted thereon and extending into the bore of the shaft, opposed bearing blocks located within the bore of the shaft, one of which is carried by the support, a guide bearing also located within said bore and carried by the support, means accessible from a point exterior of the base for changing the diameter of the guide bearing to adjust the clearance, and means supplying lubricant to one bearing from which it flows through the other.

5. A vertical shaft having a hollow end, in combination with a base, a support mounted thereon and extending into the bore of the shaft, opposed bearing blocks in the bore, one of which is carried by the support, an internally tapered guide bearing mounted upon the support between the bearing blocks and the end of the shaft, means for raising and lowering the guide bearing on the support, a conduit supplying lubricant under pressure to the bearings, and an annular member which incloses one end of the support and receives the lubricant after it exhausts from the bearings.

6. A vertical shaft having a hollow lower end, in combination with step-bearing blocks mounted in the bore of the shaft, a support for one of the blocks which is axially tapered, a sleeve mounted thereon, and a means for moving the sleeve on the tapered portion of the support to increase or decrease the clearance between it and the shaft.

7. In a turbine, a chambered base and a vertical shaft mounted therein having a hollow lower end, in combination with a step-bearing mounted in the bore of the shaft, a guide-bearing also mounted in the bore of the shaft, a support upon which the lower step-bearing block is mounted, the said support having a conical portion to receive the guide-bearing, means attached to the guide-bearing and extending through the base of the turbine, a cross head for moving said means to adjust the position of the guide-bearing on its conical support, and a device for moving the cross head.

8. A vertical shaft having a hollow lower end, in combination with a step-bearing located in the bore of the shaft, a slotted guide-bearing sleeve having a cylindrical exterior and a tapered bore, certain of the slots being open at one end of the sleeve and the remainder at the other, a support for the step-bearing which is provided with a tapered portion to fit the bore of the sleeve, and means for adjusting the sleeve up and down on the support to increase or decrease its diameter to change the clearance between it and the shaft.

In witness whereof, I have hereunto set my hand this 8th day of June, 1907.

ALPHONSO C. PRATT.

Witnesses:
 WM. A. JONES,
 D. E. PRATT.

---

Copies of this patent may be obtained for five cents each, by addressing the "Commissioner of Patents, Washington, D. C."